US008165906B2

(12) United States Patent
Gerhard et al.

(10) Patent No.: US 8,165,906 B2
(45) Date of Patent: Apr. 24, 2012

(54) BUSINESS PLANNING TOOL

(75) Inventors: Jo-Nell Katherine Kehaulani Gerhard, Ozark, MO (US); Phillip Tsen, Marlboro, NJ (US); Haris Babu Vakkayil, Plainsboro, NJ (US); Alur Vishwanath, Plainsboro, NJ (US)

(73) Assignee: International Business Machines Corporation, Armonk, NY (US)

( * ) Notice: Subject to any disclaimer, the term of this patent is extended or adjusted under 35 U.S.C. 154(b) by 1536 days.

(21) Appl. No.: 11/238,908

(22) Filed: Sep. 29, 2005

(65) Prior Publication Data

US 2007/0073573 A1 Mar. 29, 2007

(51) Int. Cl.
G06F 15/02 (2006.01)
(52) U.S. Cl. ...................... 705/7.13; 705/7.38
(58) Field of Classification Search ............ 705/9, 11, 705/7.13, 7.38
See application file for complete search history.

(56) References Cited

U.S. PATENT DOCUMENTS

| | | | | |
|---|---|---|---|---|
| 5,911,134 A * | 6/1999 | Castonguay et al. | ............. | 705/9 |
| 6,049,776 A * | 4/2000 | Donnelly et al. | ............ | 705/7.14 |
| 6,260,020 B1 | 7/2001 | Ruffin et al. | | |
| 6,275,812 B1 * | 8/2001 | Haq et al. | ..................... | 705/7.14 |
| 6,442,663 B1 | 8/2002 | Sun et al. | | |
| 6,574,605 B1 | 6/2003 | Sanders et al. | | |
| 6,895,382 B1 * | 5/2005 | Srinivasan et al. | ........... | 705/7.17 |
| 2003/0074247 A1 * | 4/2003 | Dick et al. | ........ | 705/9 |
| 2003/0130861 A1 * | 7/2003 | Seitz | .............. | 705/1 |
| 2003/0182173 A1 * | 9/2003 | D'Elena et al. | .................. | 705/9 |
| 2003/0236692 A1 * | 12/2003 | Hertel-Szabadi | ................ | 705/9 |
| 2005/0049911 A1 * | 3/2005 | Engelking et al. | ............. | 705/11 |
| 2007/0073573 A1 * | 3/2007 | Gerhard et al. | .................. | 705/9 |

OTHER PUBLICATIONS

Global Human Resource Metrics—by Helen De Cieri and John W. Boudreau CAHRS Center for Advanced Human Resource Studies Cornell University 2003.*
Barker, et al., A Load Balancing Framework for Adaptive and Asynchronous Applications, IEEE Transactions on Parallel and Distributed Systems, Feb. 2004, vol. 15 and No. 2.
Beveridge, Lynelle., Resourcing of Staff for Events, IBM Docket No. JP920000175, Oct . 2000.
Hollingsworth, et al., Prediction and Adaptation in Active Harmony, IEEE, 1998.
Lanfermann, et al., Nomadic Migration: Fault Tolerance in a Disruptive Grid Environment, Proceedings of the $2^{nd}$ IEEE/ACM International Symposium on Cluster Computing and the Grid, 2002.
Dynamic "On the Bench" Resources and Skills Information, IBM TBD Research Disclosure, May 2001.
Six Steps to Project Recovery, IBM TBD Research Disclosure, May 2001.

* cited by examiner

Primary Examiner — Beth V Boswell
Assistant Examiner — Ernest A Jackson
(74) Attorney, Agent, or Firm — Yudell Isidore Ng Russell PLLC

(57) ABSTRACT

A Global Resource Staffing Migration Analysis Resource Tool (GR SMART), which automates the global resource solution development process, including automation of global resource migration staffing and non-labor cost elements solution). GR SMART is a software utility executed by a data processing system to generate migration staffing plans and associated non-labor cost elements using minimal amounts of high level account information and baseline staffing models. Using GR SMART, users are able to override all key solution data elements to tailor (or customize) the solution to suit individual account needs. The users are also able to iteratively improve on a previous GR SMART generated solution as additional detail becomes available from the customers during the course of the sales engagement cycle.

19 Claims, 4 Drawing Sheets

GUI

ENTER ENGAGEMENT PROFILE DATA:

ENTER ACCOUNT PROFILE DATA:

SUBMIT

*Fig. 3*

BUSINESS PLANNING TOOL

BACKGROUND OF THE INVENTION

1. Technical Field

The present invention relates generally to resource management and in particular to management of staffing resources. Still more particularly, the present invention relates to a computerize method and system for efficiently evaluating staffing migration needs of a business enterprise.

2. Description of the Related Art

In today's global business environment, Application Management Services (AMS) technical solution and engagement support teams along with AMS Global Resource (GR) delivery teams of companies, such as International Business Machines (IBM), are engaged on a routine basis in the development of solutions and proposals for a variety of AMS commercial customers. A major component of AMS solutions in today's business environment is the migration of workload to GR sites outside of the host country. The AMS global organization currently utilizes a variety of disconnected tools and methods to develop GR migration/staffing models and to calculate the fixed non-labor costs associated with these models. These tools are complicated, difficult to use, and require significant amounts of account information and user input (e.g., quantifiable factors such as size of the migration, number and types of existing resources, etc.) to generate a workable GR-based solution. These and other limitations of the conventional methods necessitate development of a single, automated GR Solution Tool.

SUMMARY OF THE INVENTION

Disclosed is a Global Resource Staffing Migration Analysis Resource Tool (GR SMART), which automates the global resource solution development process, including automation of global resource migration staffing and non-labor cost elements solution). GR SMART is a software utility executed by a data processing system and which provides a series of graphical user interfaces that enable user input of migration-specific data and which generates an output based on the user inputs and other pre-existing migration data. GR SMART generates migration and steady state staffing plans and associated non-labor cost elements using minimal amounts of high level account information and baseline staffing models. Using GR SMART, users are able to override all key solution data elements to tailor (or customize) the solution to suit individual account/customer needs. The users are also able to iteratively improve on a previous GR SMART generated solution as additional detail becomes available from the customers during the course of the sales engagement cycle. GR SMART completes these processes for traditional and remote knowledge transfer-based global resource migration.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3 is an example graphical user interface (GUI) provided by execution of GR SMART software code according to one embodiment of the invention.

DETAILED DESCRIPTION OF AN ILLUSTRATIVE EMBODIMENT

The present invention provides a Global Resource Staffing Migration Analysis Resource Tool (GR SMART), which automates the global resource solution development process, including automation of global resource migration staffing and non-labor cost elements solution). GR SMART is a software utility executed by a data processing system and which provides a series of graphical user interfaces that enable user input of migration-specific data and which generates an output based on the user inputs and other pre-existing migration data. GR SMART generates migration and steady state staffing plans and associated non-labor cost elements using minimal amounts of high level account information and baseline staffing models. Using GR SMART, users are able to override all key solution data elements to tailor (or customize) the solution to suit individual account/customer needs. The users are also able to iteratively improve on a previous GR SMART generated solution as additional detail becomes available from the customers during the course of the sales engagement cycle. GR SMART completes these processes for traditional and remote knowledge transfer-based global resource migration.

A number of acronyms are utilized within the description of the invention. These acronyms and their meanings are provided in the table below.

| Acronym | Definition |
| --- | --- |
| GR SMART | Global Resource Staffing Migration Analysis Resource Tool |
| GR | Global Resources |
| AMS | Application Management Services |
| RKT | Remote Knowledge Transfer |
| D2D | Desktop to Desktop |
| eCC | eCollaboration Center |
| TSM | Technical Solution Manager |
| DEM | Delivery Engagement Manager |
| DPE | Delivery Project Executive |
| CSE | Client Solution Executive |
| FTE | Full Time Equivalent Resource |
| QA | Quality Assurance |
| PE | Project Executive |
| ASP | Application Specific Planning |
| KT | Knowledge Transfer |
| GP | Guided Perform |
| AP | Assisted Perform |
| PP | Parallel Perform |
| SS | Steady State |
| ST | Short Term |
| LT | Long Term |
| Prod. | Productive |
| Sr Migration Manager | Senior Migration Manager |
| MMT | Migration Management Team |
| OTC | One Time Cost |
| MRC | Monthly Recurring Cost |

Also, as utilized within the specification, the term "migration" refers to formal transfer of service responsibility including knowledge transfer from client staff to global resources (i.e., resources in countries like India, Brazil, and China etc.) of the company providing the global support. The embodiments described enable the company to follow a structured migration process to transfer knowledge from client staff to the Global Resources (GR) staff of the company. The embodiments also incorporate developing solutions for a business enterprise involving migration activity to global resources.

Figure 1:
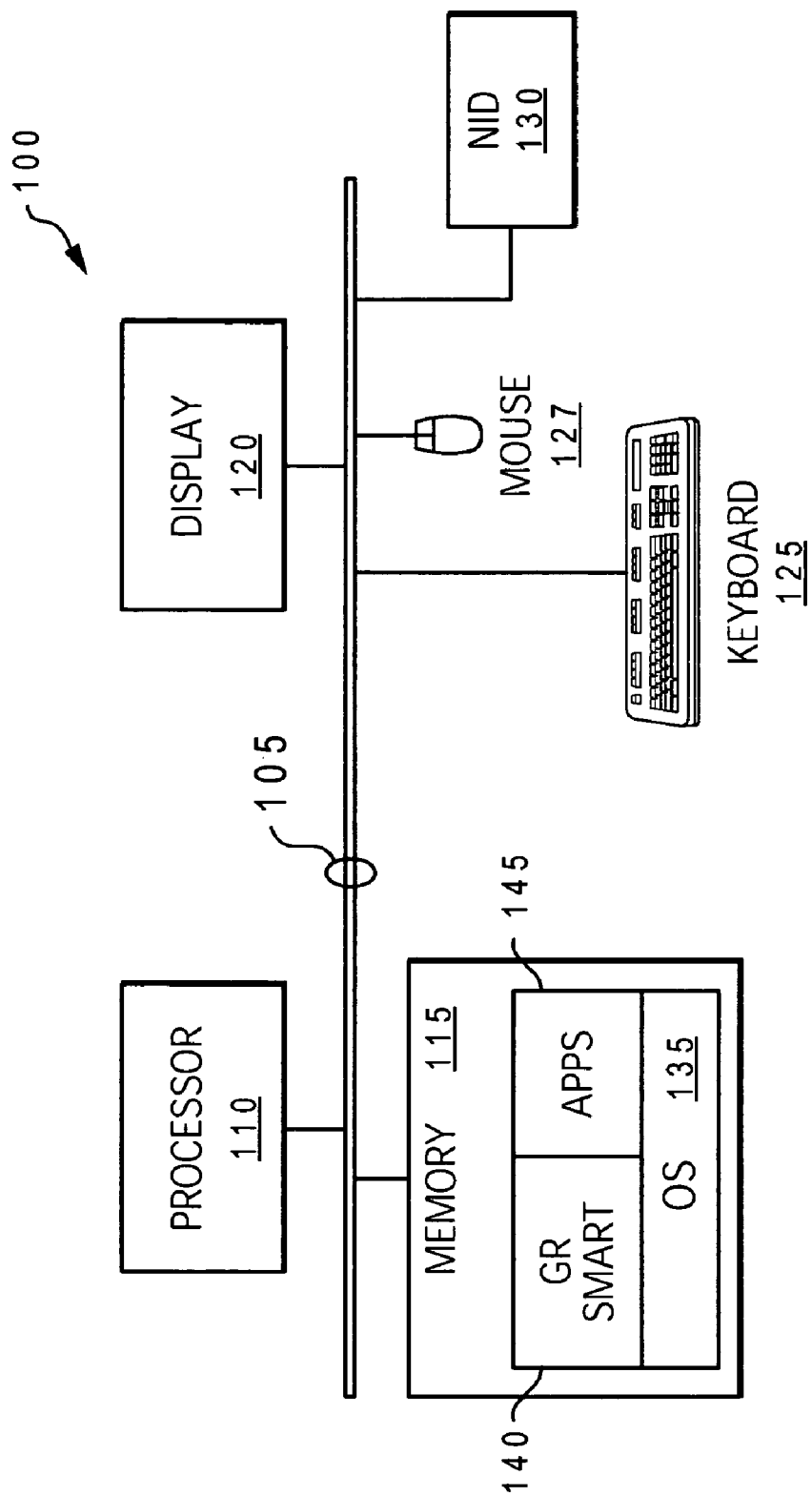
FIG. 1 is a block diagram of an exemplary data processing system within which various features of the invention are advantageously implemented.

With reference now to the figures, and in particular FIG. 1, there is illustrated an exemplary data processing system within which various functional features of embodiments of the invention may be implemented. Data processing system 100 comprises processor 110 interconnected with a plurality of other components via system bus 105. Among the other components coupled to the system bus 105 are memory 115 and several input/output devices, including keyboard 125 and pointing device 127 (e.g., mouse) and display 120. Additional hardware devices (not specifically shown) may be utilized as input and/or output devices. These additional devices include disk drive, CD or DVD ROM drive, and/or thumb drive (connected via a Universal Serial Bus port), for example. Also connected to system bus 105 is network interface device 130, utilized to connect the data processing system 100 to other computer devices and/or computer networks.

Located within memory 115 are various software components, including operating system 135 and program applications 145, which includes GR SMART 140. These software components are executed by processor 110 and provide specific programmed functionality. In particular, GR SMART 140 when executed on the processor 110 provides/enables the following functional features, among others: collecting engagement profile information; collecting account profile information; generating non-labor cost parameters having baseline values, providing the capability to override non-labor cost parameters; generating migration staffing ratios based on business logic (including baseline migration models) and inputs from the account profile; computing a staffing plan, migration calendar, non-labor costs, and RKT (Remote Knowledge Transfer) costs as output; entering solution changes due to actual data gathered during the sales engagement life cycle; and rapidly regenerating the staffing plan, migration calendar, non-labor costs, and RKT costs from solution changes due to actual data.

Several of the above features are described in greater details below, particularly those features that refer to generating a staffing plan with the specific, listed sales engagement scenario. These sales engagement scenarios include: account profile collection, solution profile, non-labor costs, migration staffing ratios, migration calendar, and RKT costs.

Figure 2:
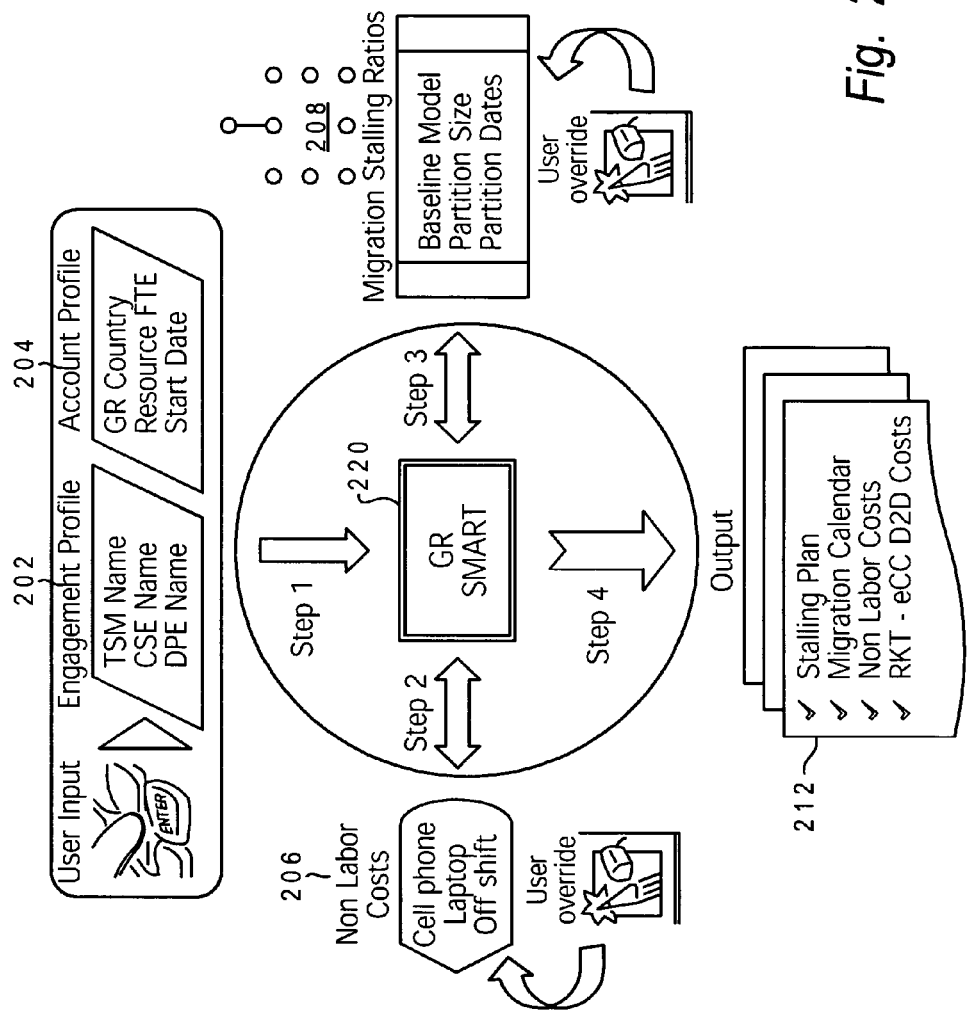
FIG. 2 is a process flow diagram illustrating the user input and application output steps associated with one embodiment of the invention.

Referring now to FIG. 2, there is illustrated a process flow diagram covering the primary functions of GR SMART processing components/logic. The processing logic provides four major functions/types/phases of operations, illustrated as steps (arrows) linking the specific function to the central GR SMART component 220. GR SMART component 220 is illustrated as central to the process flow to illustrate that the various types of information exchange identified at each step is being provided to or from GR SMART from or to the user of GR SMART. GR SMART thus receives input and generated outputs indicated by the direction of the arrows within the process flow diagram.

As shown, Step 1 links the engagement profile input 202 and account profile input 204. Step 2 links the non-labor cost parameters 206, defined with user override functionality. Step 3 links the migration staffing ratios 208, which are also defined with user override functionality. Finally, Step 4 provides GR SMART output 212. Within each block are specific elements associated with the functions represented by the block. For example, engagement profile 202 requires input of TSM name, CSE name, and DPE name, among others, while account profile 204 requires user input of GR country, Resource FTE, and start date, among others. Each step includes a particular process or series of processes, which are described below with reference both to FIG. 2 and FIG. 3.

At Step 1, the user enters information to set up the engagement profile (block 202) and account profile (block 204). This information is entered into GR SMART's first user interface (i.e., graphical user interface (GUI) 300 of FIG. 3). At Step 2, GR SMART provides the user with a view of the non-labor cost parameters within another GUI provided, and the user is able to review non-labor cost parameters baseline values and override one or more of these parameter values if the user deems an override is required. The overridden non-labor cost data is then forwarded to GR SMART component 220. At Step 3, GR SMART provides the user with a view of the migration staffing ratios within a third GUI, which ratios are generated by GR SMART based on account profile information, baseline staffing models and GR SMART business logic. The user is able to review the migration staffing ratios, and the user may override the values in migration staffing ratios if the user deems an override is required. The overridden migration staffing ratios data is then forwarded back to GR SMART component 220.

Finally, at Step 4, GR SMART processes the solution parameters defined from steps 1, 2 and 3 and provides one or more outputs 212. Outputs 212 may comprise one or more of the following: staffing plan; migration calendar; non labor costs; and RKT costs, although other outputs are possible in alternate embodiments. In one embodiment, the output may be export to a Microsoft Excel workbook. This exported data may then be utilized by other users as input to other costing tools.

It should be noted that the illustrated process flow diagram and GUIs of FIGS. 2 and 3, respectively, are provided solely for illustration and not mean to imply any limitations on the content, layout or other features associated with GR SMART. Other, primitive or more advance methods of acquiring the user input and user modifications/override may be provided within other embodiment of the invention, and it is understood that these alternate embodiments all fall within the scope/coverage of the present invention.

Figure 4:
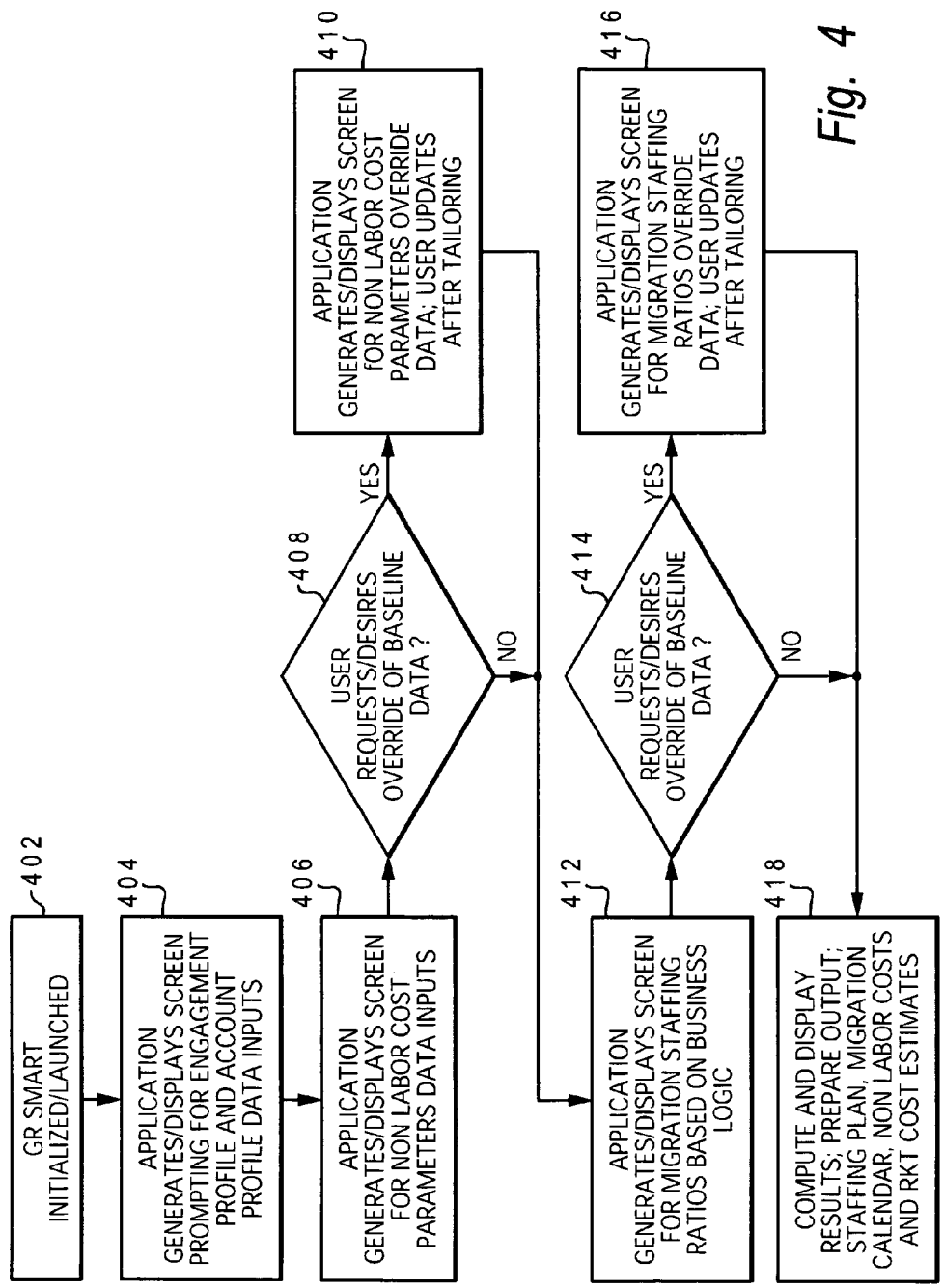
FIG. 4 is a flow chart of the process of accepting user inputs into GR SMART and tailoring the inputs to generate an output for migration solution, according to one embodiment of the invention.

FIG. 4 is a flow chart illustrating the processes of the operation of GR SMART in generating GUIs utilized to collect data from the user and generate the output/results, according to one embodiment. When GR SMART is initialized/launched (step 402), the application presents a first interface/screen asking/prompting the user to enter the first set of mandatory inputs (step 404). According to one embodiment, this initial set of inputs includes the Engagement Profile data set consisting of a series of manager names, including, for example, Technical Solution Manager (TSM), Delivery engagement manager (DEM), Client Solutions Executive (CSE), quality assurance manager, project executive, delivery project executive, and migration manager. Each migration project necessarily has different requirements for management and thus the above list is not meant to be required nor exhaustive. Along with this information, the application prompts for (and collects) the Account Profile data set, which consists of high level data set information, in the illustrative embodiment. Also, in one embodiment, GR SMART suggests data for all other elements for account profile information, except Customer Name, from baseline model defaults, and this data is automatically populated from a configuration database or internal persistent memory when GR SMART is initially executed.

Once GR-SMART confirms that the user has completed Engagement profile and Account Profile data and confirms by clicking a NEXT button, GR SMART then generates the non-labor cost parameters panel (or GUI) as the next step (step 406). In the illustrative embodiment, the non-labor cost parameters panel is generated with baseline values filled in. The user is then permitted to override the non-labor cost parameters within the panel. A check is made (step 408) whether the user requests override of one or more of the non-labor cost parameters. Assuming the user has selected the override feature, the application provides a tailored data area in the panel (step 410) through which the user elects to enter/change/update (1) remote productive resources cell phones, laptop, home connectivity (broadband) requirements, (2) landed productive resources pager, cell phones and home connectivity (broadband) requirements; and/or (3) off-shift work requirements for second and third shifts at Global Resource locations. The process of user override of baseline values is referred to herein as "tailoring." Once the user has completed tailoring by clicking on UPDATE button, GR SMART then populates all of override values to baseline area based on the business logic. The user proceeds to the next step by clicking on NEXT button.

Following, GR-SMART generates the Migration Staffing Ratios panel (step 412) which will utilize inputs from Step 1 (of FIG. 2) and the migration models for staff ramp-up and ramp-down during migration. Again, users are able to request override of the migration staffing ratio to fine tune the output results (steps 414), and the application provides another screen for entering the migration staffing override data (step 416). Once the user completes the updates of the migration staffing ratios (or if no updates were requested), the application computes and outputs the output results (step 418). These output results, in the described embodiment, consist of one or more of the following: (1) Staffing plan (displayed as month over month full time staff equivalents during migration) for all resource pools; (2) Migration Calendar; (3) Non labor costs; and (4) RKT costs. Also, the application enables the capability to export the output results to a Microsoft Excel workbook.

In one embodiment, GR SMART is designed to be utilized as a stand alone tool running on the user's local machine (data processing system). In the stand-alone configuration, GR SMART launches by loading "Baseline Solution Data" (consisting of baseline staffing models and configuration data) from a locally stored configuration file. Any changes which the user makes to the baseline solution data, results in (locally stored) "Tailored Solution Data." At any stage during solution development, the user may save the tailored solution data and resume working on the saved data at a later time. Users may elect to save a partially completed process in order to complete the solution at a later time or to fine tune the tailored solution data as more details on the account becomes available during the sales engagement life cycle. In one implementation, GR SMART provides the capability to generate an export file with the output results, which file can be sent to other reviewers. The method of transporting the results may be a physical transport (e.g., a disk, thumb drive or CD medium) or an electronic network transport (i.e., via a computer network). The reviewers are then able to import the file into another instance of GR SMART and utilize the data the same way the data would have been utilized on the originating system. In one embodiment, GR SMART also provides a printable report which includes information about the staffing plan, non labor costs, migration calendar and solution data elements.

Thus, as described in the illustrative embodiments of the invention, GR SMART provides a number of features and/or functionalities, including:

1. the ability to generate GR solution (staffing plan, migration calendar, non-labor costs and RKT costs) with minimal account information;
2. the ability to work iteratively to refine the solution based on improved data through-out the sales engagement life cycle;
3. the ability to utilize baseline staffing models for different migration profiles based on migration duration, for Traditional and D2D (Desk to Desk) GR Migration;
4. the ability of a user to tailor the baseline staffing models and other solution data elements, i.e., an override feature;
5. generating annual GR fixed costs for the life of the contract, for all non-labor costs (e.g. travel, 24×7 support, off-shift adders and RKT-costs);
6. the capability to handle variable start and variable size GR migration partitions;
7. the capability to handle variable GR migration phase durations based on migration profiles;
8. the capability to handle multiple GR countries;
9. the ability to provide table driven configuration parameters, which can be easily updated based on annual changing document of understanding (or annual changing non-labor rates) between the company and GR clients/countries;
14. the ability to provide business rules visible to the users through a friendly help system.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method comprising:
   a data processing system receiving an engagement profile input and an account profile input;
   linking the engagement profile input and the account profile input with non-labor costs parameters;
   generating migration staffing ratios from the engagement profile input, the account profile input, and one or more migration models for staffing ramp-up during migration and staffing ramp-down during migration;
   enabling entering of modified data associated with the engagement profile input, the account profile input, the non-labor costs parameters, and the migration staffing ratios;

in response to an entry of modified data, populating the associated one or more of: the engagement profile input, the account profile input, the non-labor costs parameters, and the migration staffing ratios with the modified data;

generating a solution data of a staffing migration plan for a sales engagement utilizing a combination of the engagement profile input, account profile input, non-labor cost parameters, any entered modified data, and the migration staffing ratios;

generating an output result based on said solution data and actual data gathered during a sales engagement life cycle, wherein the output result includes one or more of a staffing migration plan, a migration calendar, a non-labor costs, and remote knowledge transfer (RKT) costs from said solution data, and one or more elements of solution data; and outputting said output result within a user interface.

2. The method of claim 1, further comprising:
providing a first graphical user interface (GUI) for collecting account profile information; and
receiving the account profile information entered in the first GUI;
wherein the migration staffing ratios are generated from said account profile information entered in the first GUI and pre-specified baseline migration models.

3. The method of claim 2, further comprising:
providing a second GUI to obtain a second information on the non-labor cost parameters, said second GUI being pre-populated with values for one or more of the non-labor cost parameters, based on business logic for a solution; and
computing a staffing plan, migration calendar, non-labor costs, and RKT costs from one or more of the account profile information, non-labor cost parameters, migration staffing ratios and baseline models.

4. The method of claim 1, further comprising changing said solution data on-the fly based on actual data gathered during the sales engagement life cycle.

5. The method of claim 1, further comprising:
enabling entry of data overriding a default data provided within said first and second GUIs; and
updating the solution data of the staffing migration plan based on a calculation that includes the entered data in lieu of the default data.

6. The method of claim 5, further comprising:
generating an output of said staffing migration plan including the updated solution data; and
outputting said staffing migration plan.

7. The method of claim 6, wherein said generating includes exporting the solution data in a spreadsheet application format capable of being utilized by a corresponding spreadsheet application.

8. The method of claim 7, further comprising exporting the solution data on a medium that is capable of being read by a second computer system other than a first computer system on which the solution data is generated, wherein the solution data is able to be executed within another executable application to generate a corresponding output.

9. A computer program product comprising:
a computer readable storage medium; and
program code on the computer readable storage medium for:
receiving an engagement profile input and an account profile input;
linking the engagement profile input and the account profile input with non-labor costs parameters;
enabling entering of modified data associated with the engagement profile input, the account profile input, the non-labor costs parameters, and the migration staffing ratios;

in response to an entry of modified data, populating the associated one or more of: the engagement profile input, the account profile input, the non-labor costs parameters, and the migration staffing ratios with the modified data;

generating a solution data of a staffing migration plan for a sales engagement utilizing a combination of the engagement profile input, account profile input, non-labor cost parameters, any entered modified data, and the migration staffing ratios;

generating an output result based on said solution data and actual data gathered during a sales engagement life cycle, wherein the output result includes one or more of a staffing migration plan, a migration calendar, a non-labor costs, and remote knowledge transfer (RKT) costs from said solution data, and one or more elements of solution data; and outputting said output result within a user interface.

10. The computer program product of claim 9, further comprising program code for:
providing a first graphical user interface (GUI) for collecting account profile information; and
receiving the account profile information entered in the first GUI;
wherein the migration staffing ratios are generated from said account profile information entered in the first GUI and pre-specified baseline migration models.

11. The computer program product of claim 10, further comprising program code for:
providing a second GUI to obtain a second information on the non-labor cost parameters, said second GUI being pre-populated with values for one or more of the non-labor cost parameters, based on business logic for a solution; and
computing a staffing plan, migration calendar, non-labor costs, and RKT costs from one or more of the account profile information, non-labor cost parameters, migration staffing ratios and baseline models.

12. The computer program product of claim 9, further comprising program code for changing said solution data on-the fly based on actual data gathered during the sales engagement life cycle.

13. The computer program product of claim 9, further comprising program code for:
enabling entry of data overriding a default data provided within said first and second GUIs; and
updating the solution data of the staffing migration plan based on a calculation that includes the entered data in lieu of the default data.

14. The computer program product of claim 13, further comprising program code for:
generating an output of said staffing migration plan including the updated solution data; and
outputting said staffing migration plan.

15. The computer program product of claim 14, wherein said program code for generating includes code for exporting the solution data in a spreadsheet application format capable of being utilized by a corresponding spreadsheet application.

16. A computer device comprising:
a processor;
input/output devices; and program code executing on the processor that causes the computer device to perform a sequence of operations comprising:

receiving an engagement profile input and an account profile input;

linking the engagement profile input and the account profile input with non-labor costs parameters;

enabling entering of modified data associated with the engagement profile input, the account profile input, the non-labor costs parameters, and the migration staffing ratios;

in response to an entry of modified data, populating the associated one or more of: the engagement profile input, the account profile input, the non-labor costs parameters, and the migration staffing ratios with the modified data;

generating a solution data of a staffing migration plan for a sales engagement utilizing a combination of the engagement profile input, account profile input, non-labor cost, any entered modified data, and the migration staffing ratios;

generating an output result based on said solution data and actual data gathered during a sales engagement life cycle, wherein the output result includes one or more of a staffing migration plan, a migration calendar, a non-labor costs, and remote knowledge transfer (RKT) costs from said solution data, and one or more elements of solution data; and outputting said output result within a user interface.

17. The computer device of claim 16, said program code further comprising program code that causes the computer device to perform the following operations:

providing a first graphical user interface (GUI) for collecting account profile information;

receiving the account profile information entered in the first GUI;

providing a second GUI to obtain a second information on the non-labor cost parameters, said second GUI being pre-populated with values for one or more of the non-labor cost parameters, based on business logic for a solution; and computing a staffing plan, migration calendar, non-labor costs, and RKT costs from one or more of the account profile information, non-labor cost parameters, migration staffing ratios and baseline models;

wherein the migration staffing ratios are generated in part from said account profile information entered in the first GUI and pre-specified baseline migration models.

18. The computer device of claim 16, said program code further comprising program code that causes the computer device to perform the following operations:

enabling entry of data overriding a default data provided within said first and second GUIs;

updating the solution data of the staffing migration plan based on a calculation that includes the entered data in lieu of the default data; and changing said solution data on-the fly based on actual data gathered during the sales engagement life cycle.

19. The computer device of claim 18, said program code further comprising program code that causes the computer device to perform the following operations:

generating an output of said staffing migration plan including the updated solution data, wherein said generating includes an option for exporting the solution data in a spreadsheet application format capable of being utilized by a corresponding spreadsheet application;

outputting said staffing migration plan; and exporting said solution data when an option for enabling said exporting is selected, wherein said solution data is exported on a medium that is capable of being read by a second computer system other than a first computer system on which the solution data is generated, and wherein the solution data is able to be executed within another executable application to generate a corresponding output.

* * * * *